(12) United States Patent
Lasson et al.

(10) Patent No.: US 6,383,450 B1
(45) Date of Patent: May 7, 2002

(54) METHOD IN THE PRODUCTION OF A PRINTING INK-DECORATED PACKAGING MATERIAL

(75) Inventors: Rolf Lasson, Lund; Christer Karlsson, Bjärred; Kaj Johansson, Röstånga; Zoltan Pusztai, Staffanstorp, all of (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/423,718

(22) PCT Filed: May 12, 1998

(86) PCT No.: PCT/SE98/00869

§ 371 Date: Nov. 12, 1999

§ 102(e) Date: Nov. 12, 1999

(87) PCT Pub. No.: WO98/51492

PCT Pub. Date: Nov. 19, 1998

(30) Foreign Application Priority Data

May 14, 1997 (SE) ................................................ 9701787

(51) Int. Cl.⁷ ................................ A61L 2/00; A61L 9/00
(52) U.S. Cl. .......................... 422/28; 162/135; 422/40; 427/324; 427/361; 427/411; 428/199; 428/207; 428/211; 428/461; 428/512; 428/513
(58) Field of Search .......................... 162/135; 422/28, 422/324, 361, 391; 427/411, 207; 428/211, 199, 461, 512, 513

(56) References Cited

U.S. PATENT DOCUMENTS

| 4,133,710 A | 1/1979 | Wartenberg ................. 427/361 |
| 4,264,668 A | 4/1981 | Balla .......................... 428/195 |
| 4,629,638 A | 12/1986 | Nilsson ......................... 428/29 |
| 5,088,643 A | 2/1992 | Frazier et al. .......... 229/125.15 |
| 5,372,985 A | * 12/1994 | Chang et al. ................ 428/211 |
| 5,401,562 A | * 3/1995 | Akao ........................... 428/211 |
| 5,478,618 A | 12/1995 | Rosen ........................ 428/35.4 |
| 5,484,660 A | 1/1996 | Rosen ......................... 428/516 |

FOREIGN PATENT DOCUMENTS

| DE | 4109368 A1 | 9/1992 |
| WO | WO94/01143 | 1/1994 |
| WO | WO94/14606 | 7/1994 |

* cited by examiner

Primary Examiner—Robert J. Warden, Sr.
Assistant Examiner—Imad Soubra
(74) Attorney, Agent, or Firm—Burns, Doane, Swecker & Mathis, L.L.P.

(57) ABSTRACT

A method of producing a packaging laminate for aseptic packages of the type which is produced in that a web of the packaging laminate is, for the purpose of sterilization, led through a bath of hydrogen peroxide prior to the reforming of the web into aseptic packages. The packaging material is produced in that a web of paper which has, on the one side of the web, an applied outer coating of plastic, is, for the purpose of promoting adhesion, subjected to a surface treatment changing polarity, where after the treated outer plastic coating is provided with a decor of water-based printing ink which is applied in the desired pattern on the outside of the outer plastic coating. By selecting so-called flame treating as the surface treatment of changing polarity for the outer plastic coating, the above-mentioned sterilization can be carried out with considerably reduced hydrogen peroxide consumption, at the same time as good adhesion between the water-based printing ink decor and the outer plastic coating is ensured.

2 Claims, 1 Drawing Sheet

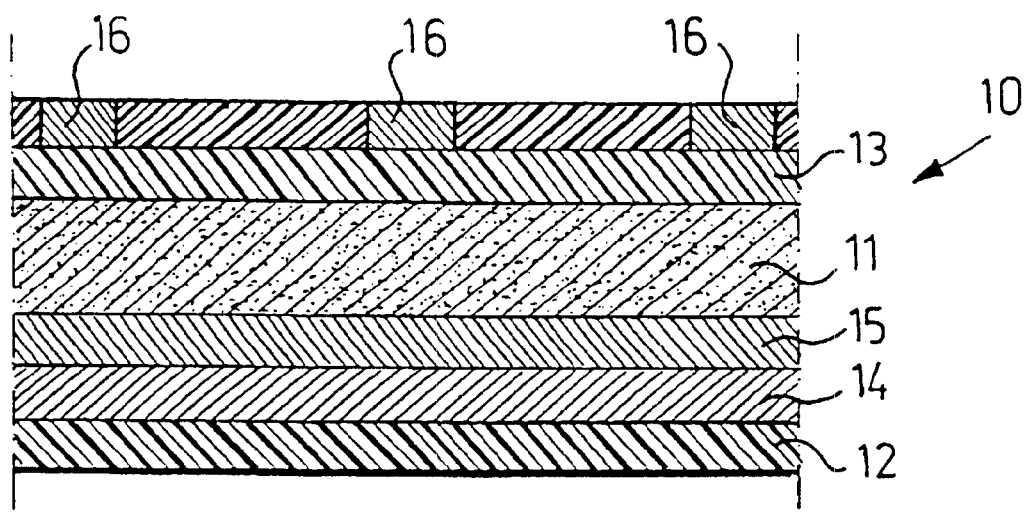

METHOD IN THE PRODUCTION OF A PRINTING INK-DECORATED PACKAGING MATERIAL

TECHNICAL FIELD

The present invention relates to a method in the production of a printing ink-decorated packaging material of laminate type, comprising an outer coating of polyethylene which serves as the décor carrier and which is preferably low density polyethylene (LDPE) having, on its outside applied décor of water-based printing ink. In particular, the present invention relates to a method in the production of such packaging material for aseptic packages of the type which is produced from a web of packaging material which, for purposes of sterilization, is led through a bath of hydrogen peroxide prior to the reforming of the web into finished, aseptic packages.

BACKGROUND ART

Packaging materials of the type described above are known in the art and are often employed in the production of dimensionally stable, liquid-tight packages for liquid foods.

Such a prior art packaging material comprises a core layer of rigid, but foldable paper and outer, liquid-tight coatings of polyethylene, preferably low density polyethylene (LDPE) of which coatings the one has, on its outside, applied decorative artwork (hereinafter referred to as décor) of water-based printing ink. A similar prior art packaging material for aseptic packages differs from the former substantially only in that its also has a layer serving as gas barrier and disposed between the core layer and one of the two outer polyethylene coatings which is intended to be turned to face inwards when the packaging material is reformed into packages. The material in the layer serving as gas barrier may be a so-called barrier polymer, for example polyamide, polyester, or ethylene vinyl alcohol copolymer (EVOH), but most generally consists of an aluminium foil (so-called Alifoil).

Packaging material of the described, prior art type is conventionally produced in that a web of rigid, but foldable paper is coated with polyethylene, preferably low density polyethylene (LDPE) which is extruded on both sides of the web for the formation of outer, liquid-tight coatings. The plastic-coated paper web is thereafter provided with the desired décor which, by means of conventional printing technique, is applied on the outside of one of the two outer polyethylene coatings, i.e. that coating which is intended to face outwards when the packaging material is to be reformed into packages.

A packaging material of the prior art type for aseptic packages is produced fundamentally in the same manner as the former packaging material, with the exception that the plastic-coated, undecorated web is provided with a barrier layer, for example an Alifoil, on one side of the web before the web is printed with printing ink.

Nowadays, dimensionally stable, liquid-tight packages are most generally produced from such packaging material with the aid of modem, high-speed packing and filling machines which, either from a web or from prefabricated sheet blanks of the packaging material, form, fill and seal the packages. From, for example a web, the packages are produced in that the web is first reformed into a tube by both longitudinal edges of the web being united with one another in an overlap joint seal. The tube is filled with the relevant contents, for example liquid food, and is divided into closed, filled packages by transverse seals transversely of the longitudinal axis of the tube and below the level of the contents in the tube. The packages are separated from one another by incisions or cuts in the transverse sealing zones and are given the desired, normally parallelepipedic configuration, by a further forming and sealing operation for the formation of the finished packages.

Aseptic packages are produced fundamentally in the same manner as above, with the crucial difference that the packaging material and the contents are sterilized prior to the filling phase, and that the filling phase takes place in a sterile environment so as to avoid reinfection of the sterilized contents.

The sterilization of the packaging material often takes place with the aid of a chemical sterilizing agent, normally an aqueous solution of hydrogen peroxide, with which that part of the packaging material which lies in interface with the sterilized contents is brought into contact. However, the entire material is often sterilized in that the web of packaging material, prior to reforming into a tube as described above, is led down into and through a bath of the aqueous hydrogen peroxide which, for a certain period of time, is allowed to act on the web for eliminating unwanted, in particular pathogenic micro-organisms.

Printing inks for the described application in connection with packaging materials are often water-based and therefore require that the surface on which they are to be applied is sufficiently hydrophilic to achieve good adhesion between the water-based printing ink and the printing surface.

A surface of polyethylene, e.g. LDPE, which is used as printing surface in the prior art packaging material is, however, hydrophobic (water repellent) and must therefore be modified in order that the water-based printing ink be absorbed and adhere with good adhesion to the surface. For the purposes of promoting adhesion, the packaging material is therefore subjected according to the prior art technique to a surface treatment which changes polarity, normally a corona treatment, as a result of which the polyethylene surface obtains the desired hydrophilic character.

While it has previously been possible to produce a printing ink-decorated packaging material of the type described by way of introduction with good adhesion between the water-based printing ink and the outer polyethylene coating, it has surprisingly proved that such a packaging material, in particular for aseptic packages, may be improved considerably in a simple manner and using simple means.

OBJECT OF THE INVENTION

One object of the present invention is, therefore, to indicate how such an improved packaging material, in particular for aseptic packages, may be produced.

SOLUTION

This object is attained according to the present invention by the method as set forth in claim 1. Further advantageous characterizing n features of the present invention are apparent from the appended claims.

OUTLINE OF THE INVENTION

By replacing the previously employed corona treatment with so-called flame treating, it is possible according to the present invention to produce a printing ink-decorated packaging material which can not only be stored in a damp environment for long storage times without the décor losing its clarity and freshness, but which also may be sterilized with aqueous hydrogen peroxide, as described previously, with considerably lower consumption of hydrogen peroxide than the corona-treated printing ink-decorated packaging material.

The explanation for the unexpected excellent results attained with the method according to the present invention is intimately related to the surface treatment carried out for the purpose of promoting adhesion. Even if a corona treatment is sufficiently effective to realise the desired modification (change of polarity) of a polyethylene coating, it is at the same time so powerful that the polyethylene coating is "broken up" when it is hit by the electric corona discharges. Such "broken up" regions wholly or partly lack hydrophilic seats which are required for the water-based printing ink to adhere with good adhesion, as a result of which the printing ink thus only partly adheres within these regions. The risk of interaction between printing ink and moisture or liquid with which the printing ink-decorated packaging material may come into contact during storage has thus increased within these "broken up" regions, with resultant action on the applied printing ink which impairs or destroys its quality.

The problem with broken up material regions is particularly serious when the packaging material is, for purposes of sterilization, led through a bath of aqueous hydrogen peroxide solution, as in the production of aseptic packages. Apart from the fact that the printing ink comes into contact and interacts with the water in the bath, the hydrogen peroxide will also be attracted and absorbed by hydrophilic seats in the polyethylene coating in broken up regions outside the applied printing ink décor, with excessive hydrogen peroxide consumption as a result.

BRIEF DESCRIPTION OF THE ACCOMPANYING DRAWING

The present invention will now be described in greater detail hereinbelow, with particular reference to the accompanying Drawing which schematically shows a cross section of a packaging material produced employing the method according to the present invention, in particular for aseptic packages.

DESCRIPTION OF PREFERRED EMBODIMENT

In the accompanying Drawing, the packaging material according to the invention has been given the generic reference numeral 10. The packaging material 10 comprises a core layer 11 of rigid, but foldable paper of conventional packaging quality, and outer, liquid-tight coatings 12 and 13 of polyethylene, preferably low density polyethylene (LDPE). Between one of the two outer polyethylene coatings 12 and the paper layer 11, there is provided an aluminium foil 14 serving as gas barrier which is bonded to the paper layer 11 by means of an interjacent layer 15 of adhesive.

As is apparent from the Drawing, the outer polyethylene coating 13 on the non-foil clad side of the paper layer 11 has, on its outside, applied décor 16 of water-soluble printing ink.

According to the invention, the packaging material 10 is produced in that a web of rigid, but foldable paper is coated with outer coatings of polyethylene which are extruded on both sides of the paper layer. The plastic-coated web is thereafter provided with an aluminium foil 14 which is laminated to that side of the paper layer 11 which is intended to face inwards when the packaging material is reformed into aseptic packages. Thereafter, the web is provided with décor 16 of water-based printing ink which is applied by means of conventional printing technique on the other side of the paper layer 11, i.e. that side which is intended to face outwards when the packaging material is reformed into packages.

In order to make possible good adhesion between the water-based printing ink and the outer polyethylene coating 13, the web is, prior to application of the printing ink, subjected to a surface treatment for changing polarity by per se known flame treating which gives the outer polyethylene coating 13 hydrophilic character, as described previously.

In practical comparative experiments, a packaging material according to the invention for aseptic packages, as shown on the accompanying Drawing, has proved to consume up to 70 per cent less hydrogen peroxide than a prior art corona-treated packaging material of the same structural make-up, when the packaging material is, for purposes of sterilization, led through a bath of hydrogen peroxide as in the production of aseptic packages.

It will thus be apparent from the foregoing description that the present invention, in a simple manner and using simple means, makes for the production of a printing ink-decorated packaging material, in particular for aseptic packages, with surprisingly good and unexpected advantages.

Naturally, many modifications and alterations in respect of the above-described specific details are possible without departing from the inventive concept as herein disclosed. Such modifications and alterations, obvious to a person skilled in the art, thus lie within the spirit and scope of the, inventive concept as this is defined in the appended claims.

What is claimed is:

1. A method for producing an ink-decorated packaging material for aseptic packages, comprising the steps of:

providing a web of packaging including a web of rigid, but foldable paper which has on its one side, an outer coating of polyethylene;

subjecting the outer coating of polyethylene to surface flame treatment thereby changing its polarity;

providing the outer coating of polyethylene with decor of water-based printing ink; and leading the web of packaging material through a bath of hydrogen peroxide for purpose of sterilization prior to reforming the web of packaging material into a finished aseptic package.

2. The method as claimed in claim 1, wherein the decor-carrying outer polyethylene coating consists of low density polyethylene.

\* \* \* \* \*